United States Patent
Dimitrov et al.

(10) Patent No.: US 11,650,964 B2
(45) Date of Patent: May 16, 2023

(54) LIMITING DOWNTIME ASSOCIATED WITH MIGRATIONS OF DATABASES

(71) Applicant: VMware, Inc., Palo Alto, CA (US)

(72) Inventors: Dimitar Slavov Dimitrov, Sofia (BG); Ivailo Vladimirov Loboshki, Sofia (BG)

(73) Assignee: VMware, Inc., Palo Alto, CA (US)

( * ) Notice: Subject to any disclaimer, the term of this patent is extended or adjusted under 35 U.S.C. 154(b) by 41 days.

(21) Appl. No.: 17/339,287

(22) Filed: Jun. 4, 2021

(65) Prior Publication Data

US 2022/0391364 A1 Dec. 8, 2022

(51) Int. Cl.
*G06F 16/21* (2019.01)
*G06F 16/23* (2019.01)
*G06F 16/25* (2019.01)

(52) U.S. Cl.
CPC ........ *G06F 16/214* (2019.01); *G06F 16/2358* (2019.01); *G06F 16/258* (2019.01)

(58) Field of Classification Search
CPC ... G06F 16/214; G06F 16/2358; G06F 16/258
See application file for complete search history.

(56) References Cited

U.S. PATENT DOCUMENTS

| 10,489,344 B1* | 11/2019 | Shaw | G06F 16/182 |
| 2019/0138496 A1* | 5/2019 | Yamaguchi | G06F 3/0604 |
| 2019/0251180 A1* | 8/2019 | Lachambre | G06F 16/258 |

* cited by examiner

*Primary Examiner* — Cam Y T Truong

(57) ABSTRACT

Described herein are systems, methods, and software to manage the downtime associated with updates and configuration modification to the database. In one implementation, a migration service initiates a migration of data from a first database to a second database. The migration service further identifies, in a transaction log, modifications to the data in the first database after initiating the migration of the data and, for each modification, applies one or more transformation rules to the modification to make a compliant modification and updates the second database with the compliant modification. Once the migration is complete and no more modifications exist in the transaction log, the migration service may transition from using the first database as an active database to using the second database as the active database.

20 Claims, 5 Drawing Sheets

LIMITING DOWNTIME ASSOCIATED WITH MIGRATIONS OF DATABASES

TECHNICAL BACKGROUND

In computing environments, relational databases store and provide access to data points that are related to one another. The data points are organized as a set of one or more tables with columns and rows, wherein each row in the table is a record with a unique key identifier and columns are used to provide attributes associated with the unique key. For example, a relational database may be used to maintain employee information for an organization, wherein each employee may be associated with a unique key identifier and columns may provide attributes associated with the employee. The attributes for each employee may include employee name, position, address, phone number, or some other information related to the employee.

Although relational databases provide a mechanism to manage and relate data points to one another, difficulties can arise when updates or other changes are required for the relational database system. In particular, due to the time requirement associated with migrating the data from an active first database to a second database, one or more modifications may be made to the data in the active first database prior to completing the migration. This may cause the second database to miss the modifications to the first database if the data associated with the modifications has already been transformed and loaded into the second database as part of the migration.

SUMMARY

The technology described herein manages downtime associated with migrations of data from a first database to a second database. In one implementation, a migration service initiates a migration of data from a first database to a second database. Once initiated, the migration service identifies, in a transaction log for the first database, one or more modifications to the data in the first database after initiating the migration of the data from the first database to the second database. For each modification of the one or more modifications, the migration service applies one or more transformation rules to the modification to make a compliant modification for the second database and updates the second database with the compliant modification. The migration service further determines when the migration of the data is complete from the first database to the second database and no additional modifications exist in the transaction log that occurred after initiating the migration and, when the migration is complete and no further modifications exist in the transaction log, transitioning from using the first database as an active database to using the second database as the active database.

DETAILED DESCRIPTION

Figure 1:
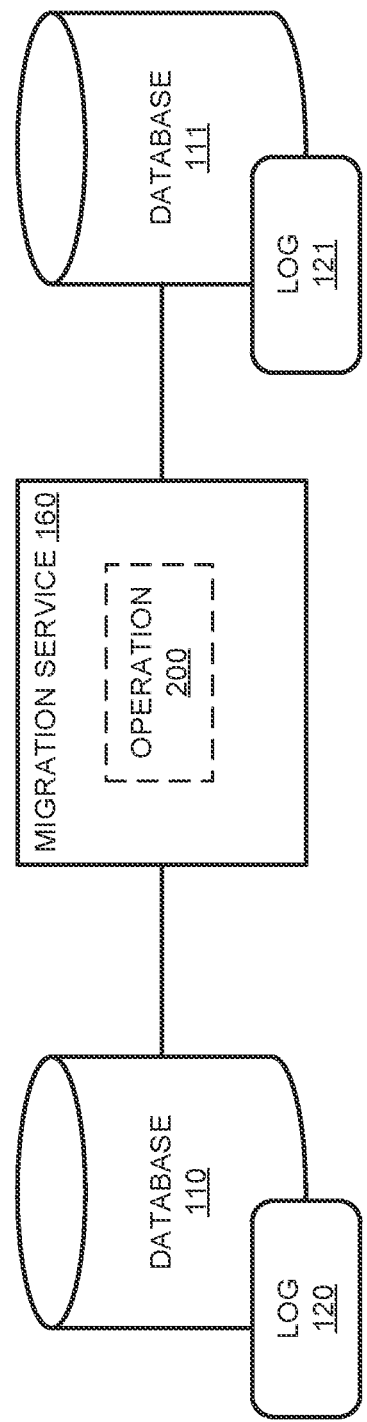
FIG. 1 illustrates a computing environment to manage a migration of data from a first database to a second database according to an implementation.

FIG. 1 illustrates a computing environment 100 to manage a migration of data from a first database to a second database according to an implementation. Computing environment 100 includes databases 110-111, logs 120-121, and migration service 160. Database 110 and log 120 are representative of a database system in a first version or of a first type, while database 111 and log 121 are representative of a database system in a second version or a second type. The versions may correspond to the same type of database system, such as different versions of a MySQL™ database, whereas the different types may comprise different database formats or distributions, such as a version of a MySQL™ database and a version of a PostgreSQL™ database.

In computing environment 100, database 110 is deployed to store data for access by one or more services, wherein database 110 may comprise a MySQL™ database, a PostgreSQL™ database, an SQLite™ database, or some other database. Database 110 may store data across one or more physical storage devices, such as hard disk drives, solid state drives, and the like, and may further be distributed across one or more physical computing systems. In some implementations, one or more services may access the database to add new data to the database, read data from the database, modify data in the database, or perform some other operation in association with the database. For example, in a database that stores information about employees of an organization, a query may be generated by a service to identify one or more employees that satisfy attribute criteria, such as employee name criteria, occupation or position criteria, location criteria, or some other attribute criteria from the database.

In addition to database 110, a relational database management service (RDBMS) maintains transaction log 120 in association with database 110. Transaction log 110 may maintain a record of the modifications made to the entries in database 110, including additions, deletions, and data changes, and may further include timestamps associated with each of the modifications. While maintaining database 110, migration service 160 may identify a request to migrate from database 110 to database 111, wherein database 111 may comprise a different version of the database or a different type of database. For example, database 110 may comprise a first version of PostgreSQL™ while database 111 may comprise a second version of PostgreSQL™. In another example, database 110 may comprise a version of PostgreSQL™ and database 111 may comprise a version of MySQL™. In response to the request, migration service 160 may initiate the migration of data from database 110 to database 111, wherein the migration may include a dump and load from database 110 to database 111. The dump and load process may include dumping the source data from database 111, applying desired changes to the data using one or more data transformation rules, and loading the transformed data into database 112. The one or more data transformation rules may be defined based on the type or version of the database 111 and the transformation may be used to update the format of data when migrated, modify a storage location of the data in the database, or provide some other transformation associated with the data. For example, an attribute for employee name in database 110 may be transformed to a different location in database 111 or may be converted to a different format.

While performing the dump and load, modifications may be made in association with active database 110. These modifications may include additions to database 110, deletions from database 110, updates to entries or data points in database 110, or some other modification. With each modification, log 120 may be updated to indicate the location of the modification in database 110, a timestamp associated with the modification, the modification itself, or some other information associated with the modification.

When the migration is initiated from database 110 to database 111, migration service 160 may perform the dump and load of the data between the databases, which can take a period of time. During the period, services accessing active database 110 may make modifications to the data in database 110. To account for possible modifications that occur during the dump and load period, migration service 160 may identify all modifications in log 120 with a time stamp after the initiation of the migration. In some examples, the time stamp may include a time, however, it should be understood that the timestamp may include transaction number or some other unique value to indicate the sequence of the changes in the log. For each of the modifications, migration service 160 may apply one or more transformation rules to create a compliant modification for database 111 and may update database 111 with the compliant modification. For example, if new data were added in database 110 after the initiation of the migration, migration service 160 may apply the transformation rules to determine where the data should be stored in database 111. Once determined, migration service 160 may update database 111 by storing the data in compliance with database 111.

After the data has been dumped and loaded from database 110 to database 111 and no modifications from log 120 remain that occurred after initiating the migration, migration service 160 may determine that database 111 is ready to become the active database for one or more services. Accordingly, migration service 160 may direct the one or more services, using addressing, permissions, and the like, to use database 111 in place of database 110. Once the services are directed to the replacement database, migration service 160 may delete database 110. In some implementations, migration service 160 may further update log 121 based on log 120, wherein migration service 160 may apply one or more transformation rules to the modifications in log 120 to place the modifications in compliance for log 121.

Figure 2:
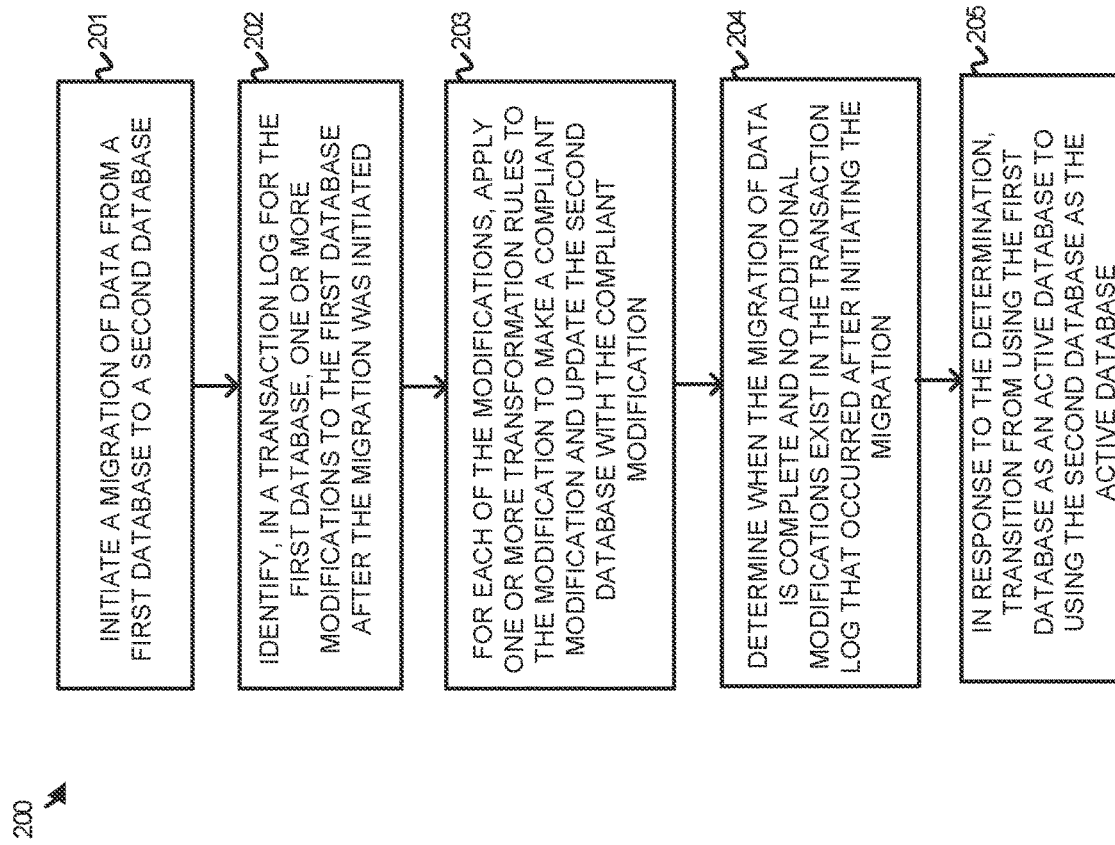
FIG. 2 illustrates an operation of a migration service to manage a migration of data from a first database to a second database according to an implementation.

FIG. 2 illustrates an operation 200 of a migration service to manage a migration of data from a first database to a second database according to an implementation. The steps of operation 200 are referenced parenthetically in the paragraphs that follow with reference to systems and elements of computing environment 100 of FIG. 1.

As depicted, migration service 160 provides operation 200 that initiates (201) a migration of data from a first database to a second database. In some implementations, the migration may include a dump and load process. The dump and load process includes dumping the data from database 110, wherein dumping the data comprises generating a record of the table structure and/or data from database 110, which may take the form of SQL statements in some examples. Additionally, as part of the dump and load process, migration service 160 applies one or more transformation rules to the data to put the data in compliance with database 111 and loads the compliant data into database 111.

In some examples, the migration might include streaming the data from database 110 to database 111 and, once the data is streamed, transforming the data at database 111 from a first scheme to a second scheme. The first and second schemes may comprise different storage locations for the data points, different storage formats for the data points, different labels, or some other difference in scheme.

In some implementations, the second database may comprise an updated version of the first database, wherein the new database may include additional features, security, improved efficiency, and the like. In other implementations, the second database may comprise a different type of database, such as a different distribution.

Once the migration is initiated by migration service 160, operation 200 further identifies (202), in a transaction log for the first database, one or more modifications to the data in the first database after initiating the migration of the data from the first database to the second database. In some examples, one or more services accessing database 110 may implement one or more modifications to the database during the period of dumping data from database 110, applying the transformation rules on the data, and loading the transformed data into database 111. Each of these modifications may be recorded in log 120, wherein the log may indicate a timestamp for the modification and information about the data that was added, removed, or otherwise modified. Any modification in log 120 that occurred with a timestamp after the initiation of the migration may be identified as relevant by migration service 160. For each modification in the one or more modifications, operation 200 may apply (203) one or more transformation rules to the modification to make a compliant modification for the second database and update the second database with the compliant modification. In some implementations, modifications to database 110 may modify a portion of the database that has already been extracted or dumped and loaded into database 111. Accordingly, migration service 160 may use the information from log 120 to update database 111 with any changes that might have occurred during the migration of the data. For example, a first portion of data may be migrated and stored in database 111, however, a modification may be implemented at database 110 for that portion after starting the migration. Migration service 160 may identify the modification from log 120 and use the modification from the log to implement the update in database 111. In some implementations, migration service 160 may identify the modifications in log 120 only when the initial migration from database 110 is complete. In other implementations, at least a portion of the modifications identified in log 120 may be used to update database 111 during the process of dumping and loading the data into database 111.

As migration service 160 processes the transaction log, migration service 160 may determine (204) when the migration of the data is complete from the first database to the second database and no additional modifications exist in the transaction log that occurred after initiating the migration. Once the migration is complete and the transaction log no longer includes modifications that occurred after initiating the migration, migration service 160 may transition (205) from using the first database as an active database to using the second database as the active database. The transition may include changing addressing, permissions, or other access information to use the second database in place of the first database. In some implementations, once transitioned, the first database or database 110 may be deleted once the second database is active for the one or more services. In some implementations, in addition to building database 111, log 121 may be built from log 120, wherein the log entries may be transformed to come into compliance with the transaction log associated with database 111.

Figure 3:
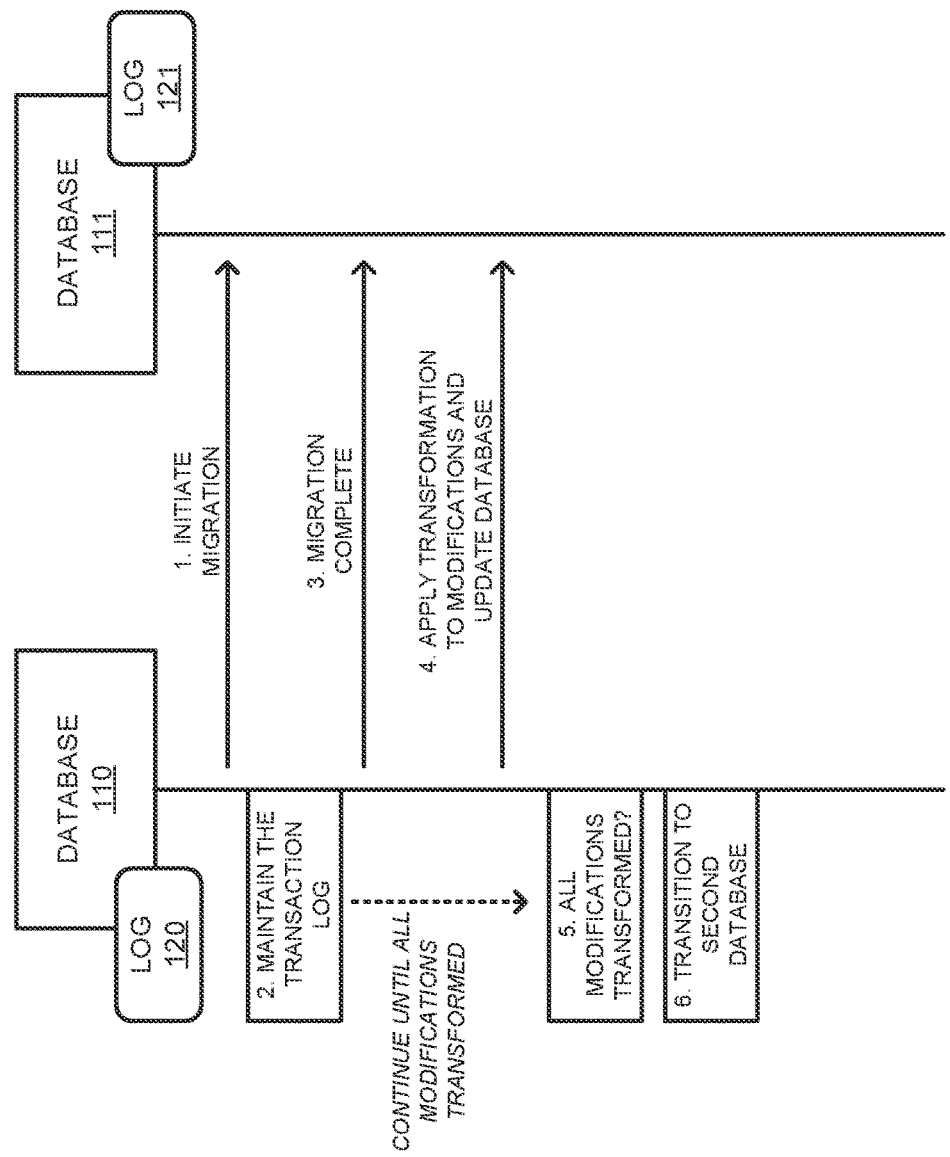
FIG. 3 illustrates a timing diagram to manage a migration from a first database to a second database to a second database according to an implementation.

FIG. 3 illustrates a timing diagram 300 to manage a migration from a first database to a second database according to an implementation. Timing diagram 300 includes databases 110-111 and logs 120-121 of computing environment 100 of FIG. 1.

As depicted, a migration service may initiate, at step 1, a migration of the data from database 110 to database 111. This migration may include a dump and load operation, wherein the data from database 110 may be dumped, transformed, and loaded in database 111 in a format compliant with database 111. As the data is migrated from the database, one or more modifications may be made to database 110, such as adding, deleting, or changing data in the database. Thus, while a portion of database 110 may already be transformed and loaded into database 111, the portion may be modified by one or more services with access to database 110. To monitor the modifications, database 110 may maintain, at step 2, the transaction log that indicates changes to the database after starting the migration of data from database 110 to database 111. The transaction log may include a timestamp for the modification, the modification itself, or any other information about the modifications to database 111.

While the transaction log is maintained, the migration service may determine when the migration is complete, at step 3. Once complete, the migration service may identify the one or more modifications to the data in the first database after initiating the migration of the data from the first data base to the second database. For each of the one or more modifications, the migration service may, at step 4, apply one or more transformation rules to the modification to make a compliant modification for database 111 and may update database 111 with the compliant modification. In some implementations, an administrator or developer may define data transformation rules that can indicate changes to the format of data from a first database to a second database, storage location changes from the first database to the second database, or some other data transformation from the first database to the second database. In some implementations, the rules may be used to update the version of the database from a first version to a second version. In other implementations, the rules may be used to change the database from a first type of database to a second type of database. For example, database 110 may comprise a version of PostgreSQL™ and database 111 may comprise a version of MySQL™. In some examples, as part of the dump and load from database 110-111, the data from database 110 may have the same transformation rules applied to make the data compliant for database 111. Once compliant, the data from the first database may be stored in database 111.

As the migration service applies the transformation rules to the modifications identified in log 120, the migration service may, at step 5, determine when all modifications that occurred after the initiation of the migration have been transformed and applied to the database 111. For example, the migration service may identify that four modifications have been implemented in database 110 after the initiation of the migration to database 111. Accordingly, the migration service may apply one or more transformation rules to each of the four modifications and update database 111 with the compliant modifications for database 111. Once all modifications that occurred after the initiation of the migration have been processed and used to update database 111, the migration service may transition the active database from database 110 to database 111, permitting applications that use the database to use database 111 in place of database 110. The transition may include providing addressing information, accessibility information, or some other information to the applications or the proxy that directs requests from the applications to the active database. Once the active database is transitioned to database 111, the migration service may delete database 110.

In some implementations, the one or more transformation rules may be defined by an administrator or developer associated with database 111. For example, the one or more transformation rules may be defined in conjunction with an update a database from a first version to the second version. The transformation rules may also be used in implementing the dump and load process for the data from database 110 to database 111, wherein the transformation rules may be used to change the format associated with the data in the database, the storage location in the database, or some other modification in association with the database. For example, data points in database 110 may be stored in a first format, while the same data points may be stored in a second format in database 111. As a result, each data point may be converted using the migration service to change the data point from the first format to the second format.

In some examples, in addition to updating database 111, the migration service may be used to generate or update log 121. In particular, the migration service may use one or more transformation rules to bring each entry or modification in log 120 into compliance with a format for log 121. Once in compliance, log 121 may be updated with the modification to allow log 121 to reflect log 120. The different formats may include different formats for the data points associated with the modifications, different time stamp formats, or some other format different between the transaction logs.

Figure 4:
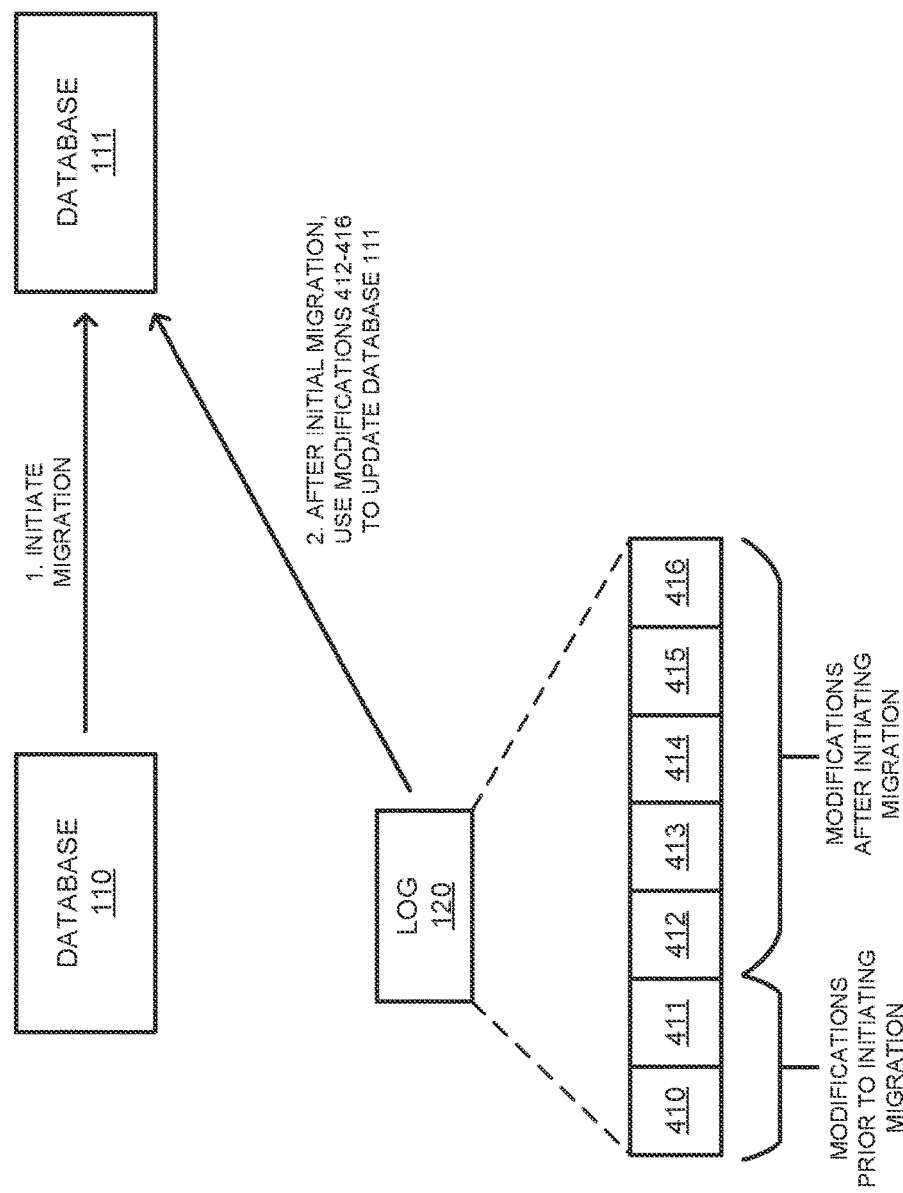
FIG. 4 illustrates an operational scenario of using a buffer associated with a transaction log to update a second database according to an implementation.

FIG. 4 illustrates an operational scenario 400 of using a buffer associated with a transaction log to update a second database according to an implementation. Operational scenario 400 includes databases 110-111 and log 120 of computing environment 100 of FIG. 1. Operational scenario 400 further includes modifications 410-416 that are included in log 120 and reflect modifications to database 110.

In operational scenario 400, a migration service may initiate, at step 1, a migration of data from database 110 to database 111. In some implementations, the migration may include dumping or extracting the data from database 110, transforming the data to place the data in compliance with the version or type of database for database 111, and load the transformed data into database 111. In some implementations, the migration may include stream replication, wherein the data is streamed from database 110 to database 111 to generate a duplicate of database 110 and, once streamed, the database is updated or changed to a different version. Wherein the transformation may include applying one or more rules to the data stored in database 111. Advantageously, in stream replication database 111 may initially store the data in the same scheme as database 110 and use one or more transformation rules to update the scheme to a second scheme. This update may include updating the storage location of data points in database 111, updating the format of the data in database 111, or providing some other transformation to change the storage of the data in the first scheme to a second scheme.

In addition to migrating the data from the first database to the second database, the migration service may further identify one or more modifications in a transaction log that occurred after initiating the migration. In some implementations, because the migration is not instantaneous, one or more modifications may be made to database 110 before the data can be fully transformed and loaded into database 111. This may cause first portion of data to be transformed and loaded into database 111 from database 110 even though the first portion of data was modified prior to completing the migration. Here, modifications 412-416 represent modifications to database 110 that occurred after initiating the migration to database 111. The migration service may identify these modifications based on the timestamps associated with the modifications in relation to a timestamp for initiating the migration. For each modification of modifications 412-416, one or more transformation rules are applied to the modification to create a compliant modification and database 111 is updated to include the compliant modification. For example, a modification in log 120 may indicate that a first value was replaced with a second value in database 110 following the start of the migration to database 111. As a result, if a transformation rule required that the second value be modified from a first format to a second format, the second value may be updated to the appropriate format prior to updating the database 111 with the second value.

Once the migration is complete from database 110-111 and no more modifications exist in log 120 that correspond to modifications to database 110 after initiating the migration, the migration service may determine that the migration is complete. When complete, the migration service may transition active database from database 110 to database 111, wherein the transition may permit requests to the active database to be received by database 111 in place of database 110. Once transitioned, database 110 may be deleted in some examples along with log 120. In some implementations, the migration service may further use log 120 to generate or update a log associated with database 111. In updating the transaction log for database 111, the migration service may apply transformation rules to the various entries in log 120 to place the entries in the log in compliance with the log for database 111.

Figure 5:
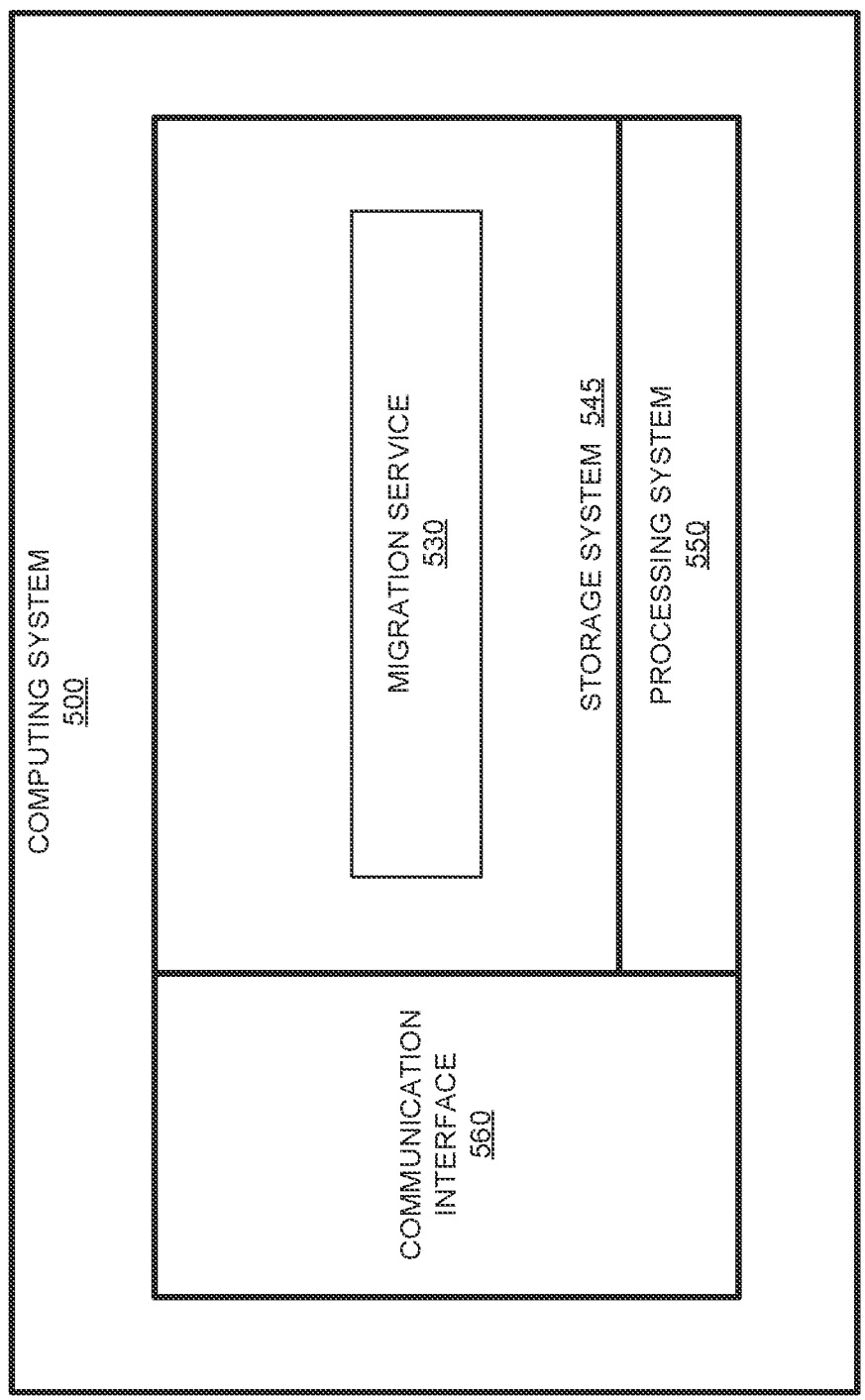
FIG. 5 illustrates a computing system to manage a migration of data from a first database to a second database according to an implementation.

FIG. 5 illustrates a computing system 500 to manage a migration of data from a first database to a second database according to an implementation. Computing system 500 is representative of any computing system or systems with which the various operational architectures, processes, scenarios, and sequences disclosed herein for a migration service can be implemented. Computing system 500 is an example commuting system to provide migration service 160 of FIG. 1, although other examples may exist. Computing system 500 includes storage system 545, processing system 550, and communication interface 560. Processing system 550 is operatively linked to communication interface 560 and storage system 545. Communication interface 560 may be communicatively linked to storage system 545 in some implementations. Computing system 500 may further include other components such as a battery and enclosure that are not shown for clarity.

Communication interface 560 comprises components that communicate over communication links, such as network cards, ports, radio frequency (RF), processing circuitry and software, or some other communication devices. Communication interface 560 may be configured to communicate over metallic, wireless, or optical links. Communication interface 560 may be configured to use Time Division Multiplex (TDM), Internet Protocol (IP), Ethernet, optical networking, wireless protocols, communication signaling, or some other communication format—including combinations thereof. Communication interface 560 may be configured to communicate with one or more computing systems that provide resources for a first database and a second database. The one or more computing systems may comprise server computing systems, desktop computing systems, or some other computing system.

Processing system 550 comprises microprocessor and other circuitry that retrieves and executes operating software from storage system 545. Storage system 545 may include volatile and nonvolatile, removable and non-removable media implemented in any method or technology for storage of information, such as computer readable instructions, data structures, program modules, or other data. Storage system 545 may be implemented as a single storage device, but may also be implemented across multiple storage devices or sub-systems. Storage system 545 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 550 is typically mounted on a circuit board that may also hold the storage system. The operating software of storage system 545 comprises computer programs, firmware, or some other form of machine-readable program instructions. The operating software of storage system 545 comprises migration service 530 capable of providing at least operation 200 described in FIG. 2. The operating software on storage system 545 may further include an operating system, utilities, drivers, network interfaces, applications, or some other type of software. When read and executed by processing system 550 the operating software on storage system 545 directs computing system 500 to operate as described herein.

In at least one implementation, migration service 530 directs processing system 550 to initiate a migration of data from a first database to a second database, wherein the first database and second database may exist on one or more computing systems and one or more data storage devices. In some examples, at least a portion of the first database or the second database may exist on the same computing system as migration service 530. The migration may include a dump and load from the first database to the second database, wherein the data may be dumped or extracted from the first database, transformed using one or more transformation rules, and loaded into the second database. The transformation may include changing the format associated with at least a portion of the data, changing the storage location of at least a portion of the data, or some other transformation of the data. In some implementations, the migration may include streaming or copying the data from the first database to the second database. Once streamed, the transformation rules may be applied to update a version of the database from a first version to a second version.

Once initiated, migration service 530 directs processing system 550 to identify, in a transaction log for the first database, one or more modifications to the data in the first database after initiating the migration of the data from the first database to the second database. In some implementations, the migration of data from the first database to the second database may use a dump and load operation, wherein the data is extracted or dumped from the first database, transformed into a format compliant with the second database, and loaded into the second database. While performing the migration operation, one or more services that use the database may make modifications to the first database, wherein the modifications may not be reflected in the data loaded in the second database. To compensate for these modifications, migration service may process a transaction log associated with the first database to identify modifications that were made to the first database after initiating the migration to the second database.

Once the one or more modifications are identified, migration service 530 directs processing system 550 to, for each modification of the one or more modifications, apply one or more transformation rules to the modification to make a compliant modification for the second database and update the second database with the compliant modification. The transformation rules may be used to change the format of the data associated with the modification, may be used to change the storage location of the data associated with the modification for the second, or may be used to provide some other transformation in association with the data from the transaction log for the first database. For example, first data in the first database may be changed to second data after initiating the migration from the first database to the second database. When the change is made, an entry may be made in the log for the first database that indicates the data that was changed, and a timestamp associated with the change. Migration service 530 may identify the entry in the log, apply one or more transformation rules to the second data, and update the second database with the second data. For example, if the second database maintained data in a different format, migration service 530 may direct processing system 550 to modify the format for the second data to the compliant format for the second database.

In some implementations, migration service 530 may direct processing system 550 to identify when the initial dump and load of data from the first database to the second database is complete. For example, data may be streamed and transformed from the first database to the second database. Once the migration service determines that the stream has reached the end of the data set or the initial dump of data has been loaded into the second database, migration service 530 may select modifications from the transaction log associated with the first database with time stamps that indicate the modifications occurred after initiating the migration. In some examples, migration service 530 may process the modifications in order from the modification that occurred nearest to the initiated migration to the modification that occurred most recent. However, it should be understood that the modifications may processed at least partially in some examples. Once each of the modifications have been transformed and used to update the second database, the second database may become the active database for one or more services, wherein the services may generate queries to identify relevant data, modify or add information to the database, or provide some other operation in association with the database.

In some examples, the migration from the first database to the second database may be used to provide an updated version of a database as part of the second database. In this example, to initiate the migration of the data, the data base streamed or replicated from the first database to the second database. Once streamed, the database may be updated using one or more transformation rules that can change the format for objects in the database, the storage location of the objects in the database, or some other modification to the database. During the application of the one or more transformation rules to update the second database, modifications may be made to the first database. Accordingly, migration service 530 may, after completing the update to the second database, identify the modifications that occurred during the stream and update in the transaction log for the first database. Once identified, the modifications may be used to update the second database to reflect the changes and, after determining that all of the modifications are reflected in the second database, permit the transition from the first database as the active database to the second database as the active database.

In some implementations, migration service 530 may further direct processing system 550 to update a second transaction log associated with the second database. In updating the transaction log for the second database, migration service 530 may identify modification entries in the transaction log for the first database, apply one or more transformation rules to place the modification in a format in accordance with the second database.

Once the second database includes the required modifications and, in some examples, the transaction log is updated for the second database, modification service 530 directs processing system 550 to transition one or more services from using the first database to using the second database. The transition may include providing addressing, permissions, or other access information to the one or more services to make the second database available in place of the first database. Additionally, modification service 530 may initiate operations to delete the data from the first database when the second database is active.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   initiating a migration of data from a first database to a second database;
   identifying, in a transaction log for the first database, one or more modifications to the data in the first database after initiating the migration of the data from the first database to the second database, wherein the one or more modifications comprise one or more additions or deletions to entries in the first database;
   for each modification of the one or more modifications:
      applying one or more transformation rules to the modification to make a compliant modification for the second database;
      updating the second database with the compliant modification;
   determining when the migration of the data is complete from the first database to the second database and no additional modifications exist in the transaction log that occurred after initiating the migration; and
   in response to determining that the migration of the data is complete and that no additional modifications exist in the transaction log that occurred after initiating the migration, transitioning from using the first database as an active database to using the second database as the active database.

2. The method of claim 1, wherein the second database comprises an updated version of the first database.

3. The method of claim 1, wherein the second database comprises a different type of database from the first database.

4. The method of claim 1, wherein the migration of the data from the first database to the second database comprises a dump and load of the data from the first database to the second database.

5. The method of claim 1, wherein the migration of the data from the first database to the second database comprises a stream of data from the first database to the second database and, in response to completing the stream, a transformation the data at the second database from a first scheme to a second scheme.

6. The method of claim 1 further comprising:
determining when the migration of the data is complete; and
wherein identifying the one or more modifications to the first database after initiating the migration of the data from the first database to the second database occurs in response to determining that the migration of the data is complete.

7. The method of claim 1 further comprising:
in response to transitioning from using the first database as an active database to using the second database as the active database, deleting the first database.

8. The method of claim 1 further comprising:
updating a second transaction log associated with the second database based on the transaction log for the first database.

9. A computing apparatus comprising:
a storage system comprising memory;
a processing system operatively coupled to the storage system;
program instructions stored on the storage system that, when executed by the processing system, direct the computing apparatus to:
initiate a migration of data from a first database to a second database;
identify, in a transaction log for the first database, one or more modifications to the data in the first database after initiating the migration of the data from the first database to the second database, wherein the one or more modifications comprise one or more additions or deletions to entries in the first database;
for each modification of the one or more modifications:
apply one or more transformation rules to the modification to make a compliant modification for the second database;
update the second database with the compliant modification;
determine when the migration of the data is complete from the first database to the second database and no additional modifications exist in the transaction log that occurred after initiating the migration; and
in response to determining that the migration of the data is complete and that no additional modifications exist in the transaction log that occurred after initiating the migration, transition from using the first database as an active database to using the second database as the active database.

10. The computing apparatus of claim 9, wherein the second database comprises an updated version of the first database.

11. The computing apparatus of claim 9, wherein the second database comprises a different type of database from the first database.

12. The computing apparatus of claim 9, wherein the migration of the data from the first database to the second database comprises a dump and load of the data from the first database to the second database.

13. The computing apparatus of claim 9, wherein the migration of the data from the first database to the second database comprises a stream of data from the first database to the second database and, in response to completing the stream, a transformation the data at the second database from a first scheme to a second scheme.

14. The computing apparatus of claim 9, wherein the program instructions further direct the computing apparatus to:
determine when the migration of the data is complete; and
wherein identifying the one or more modifications to the first database after initiating the migration of the data from the first database to the second database occurs in response to determining that the migration of the data is complete.

15. The computing apparatus of claim 9, wherein the program instructions further direct the computing apparatus to:
in response to transitioning from using the first database as an active database to using the second database as the active database, delete the first database.

16. The computing apparatus of claim 9, wherein the program instructions further direct the computing apparatus to:
update a second transaction log associated with the second database based on the transaction log for the first database.

17. An apparatus comprising:
a storage system comprising memory; and
program instructions stored on the storage system that, when executed by a processing system, direct the processing system to:
initiate a migration of data from a first database to a second database;
identify, in a transaction log for the first database, one or more modifications to the data in the first database after initiating the migration of the data from the first database to the second database;
for each modification of the one or more modifications:
apply one or more transformation rules to the modification to make a compliant modification for the second database;
update the second database with the compliant modification;
determine when the migration of the data is complete from the first database to the second database and no additional modifications exist in the transaction log that occurred after initiating the migration; and
in response to determining that the migration of the data is complete and that no additional modifications exist in the transaction log that occurred after initiating the migration, transition from using the first database as an active database to using the second database as the active database.

18. The apparatus of claim 17, wherein the one or more modifications comprise one or more additions or deletions to the first database.

19. The apparatus of claim 17, wherein the second database comprises an updated version of the first database.

20. The apparatus of claim 17, wherein the second database comprises a different type of database from the first database.

* * * * *